(12) United States Patent
Jang (10) Patent No.: US 9,548,171 B2
(45) Date of Patent: Jan. 17, 2017

(54) SWITCHBOARD

(71) Applicant: LSIS CO., LTD., Anyang-si, Gyeonggi-do (KR)

(72) Inventor: Jun Yong Jang, Cheongju-si (KR)

(73) Assignee: LSIS CO., LTD., Anyang-si (KR)

( * ) Notice: Subject to any disclaimer, the term of this patent is extended or adjusted under 35 U.S.C. 154(b) by 225 days.

(21) Appl. No.: 14/465,117

(22) Filed: Aug. 21, 2014

(65) Prior Publication Data

US 2015/0129397 A1    May 14, 2015

(30) Foreign Application Priority Data

Nov. 11, 2013  (KR) .......................... 10-2013-0136456

(51) Int. Cl.
*H01H 9/22* (2006.01)
*H02B 1/38* (2006.01)

(52) U.S. Cl.
CPC .................. *H01H 9/22* (2013.01); *H02B 1/38* (2013.01); *H01H 2221/052* (2013.01)

(58) Field of Classification Search
CPC .................................... H01H 9/22; H01H 9/20
USPC ...................... 200/50.19, 330, 336–338, 329
See application file for complete search history.

(56) References Cited

U.S. PATENT DOCUMENTS

| 3,192,334 A | 6/1965 | Dimond et al. |
| 3,629,536 A * | 12/1971 | Rys .......................... H01H 9/22 200/294 |
| 4,835,350 A | 5/1989 | Ozu et al. |
| 2008/0053797 A1 | 3/2008 | Farrow et al. |

FOREIGN PATENT DOCUMENTS

| CN | 1031002 | 2/1989 |
| CN | 201853955 | 6/2011 |
| JP | 64-006706 | 1/1989 |
| JP | 10-069845 | 3/1998 |
| JP | 2007-217909 | 8/2007 |
| JP | 2001339817 | 12/2011 |

(Continued)

OTHER PUBLICATIONS

Japan Patent Office Application Serial No. 2014-190737, Office Action dated Aug. 4, 2015, 3 pages.

(Continued)

*Primary Examiner* — Edwin A. Leon
*Assistant Examiner* — Iman Malakooti
(74) *Attorney, Agent, or Firm* — Lee, Hong, Degerman, Kang & Waimey PC (57) ABSTRACT

Disclosed is a switchboard. The switchboard includes a switchboard case with a built-in circuit breaker, a door mounted on the switchboard case in a hinge structure to be opened or closed and configured to include a door hook including an inclined surface at a front end, an external manipulation handle provided at an outer side of the switchboard case and configured to manually, externally manipulate a switch-on or off operation of the circuit breaker, and a catching member disposed in the switchboard case to be contactable with the inclined surface of the door hook. The catching member rotates by contacting the inclined surface of the door hook according to a closing operation of the door, and a locked state of the door is maintained by catching the door hook on one side corner of the catching member.

11 Claims, 10 Drawing Sheets

(56) References Cited

FOREIGN PATENT DOCUMENTS

KR  10-2011-0091205    8/2011
KR  10-2011-0128074    11/2011

OTHER PUBLICATIONS

European Patent Office Application Serial No. 14181712.2, Search Report dated Apr. 7, 2015, 6 pages.
Korean Intellectual Property Office Application Serial No. 10-2013-0136456, Notice of Allowance dated Mar. 6, 2015, 2 pages.
State Intellectual Property Office of the People's Republic of China Application No. 201410642667.1, Office Action dated May 12, 2016, 6 pages.

* cited by examiner

< OFF >

FIG. 6C

< RESET >

SWITCHBOARD

CROSS-REFERENCE TO RELATED APPLICATION

Pursuant to 35 U.S.C. §119(a), this application claims the benefit of earlier filing date and right of priority to Korean Application No. 10-2013-0136456, filed on Nov. 11, 2013, the contents of which are all hereby incorporated by reference herein in its entirety.

BACKGROUND OF THE DISCLOSURE

1. Field of the Disclosure

The present disclosure relates to a switchboard which enables a user to easily close a door.

2. Background of the Disclosure

Generally, a molded case circuit breaker (MCCB) is an electronic device which automatically breaks a circuit when overload or short circuit occurs in electricity, thereby protecting the circuit and a load device. When the MCCB is provided in a switchboard, a separate external manipulation handle device is used in connection with the MCCB so as to manually manipulate, outside the switchboard, an on/off of a handle of the circuit breaker.

Figure 1:
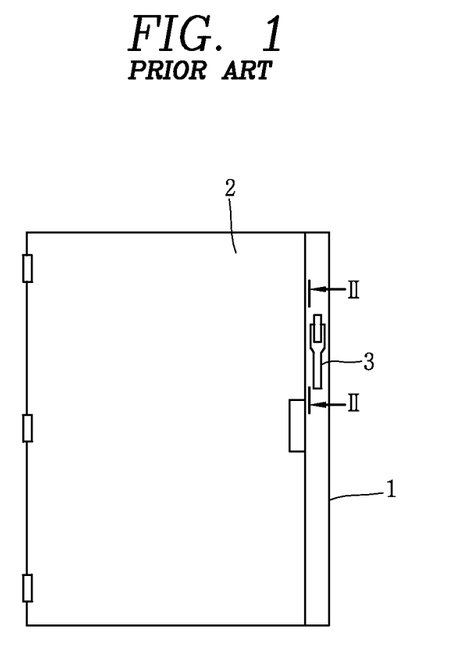
FIG. 1 is a front view illustrating an external handle manipulation device of a switchboard case of the prior art.

FIG. 1 is a front view illustrating an external handle manipulation device of a switchboard case of the prior art. An MCCB is provided in a switchboard case 1, and a door 2 is provided at the switchboard 1 in a hinge structure, and closes or opens a front open part of the switchboard case 1. Also, a manipulation handle 3 is provided at external one side of the switchboard case 1 to be rotatable in a vertical direction.

An operation link part is connected between the external manipulation handle 3 and a handle of the MCCB, and a handle position of the MCCB may be adjusted to an on/off state by upward and downward rotating the external manipulation handle.

Figure 2A:
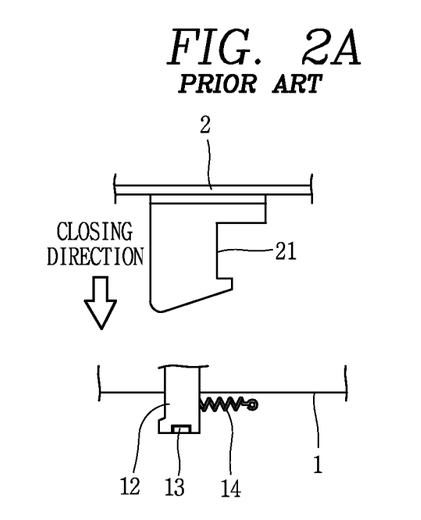
FIGS. 2A and 2B are a state view illustrating an operation when a door is closed, in the external handle manipulation device of the switchboard case of the prior art.
Figure 2B:
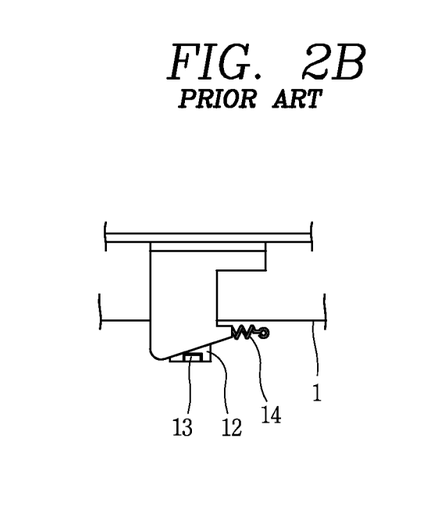

FIGS. 2A and 2B are a state view illustrating an operation when a door is closed, in the external handle manipulation device of the switchboard case of the prior art. A door hook 21 is provided to protrude at an inner side of a door 2, and a catching member 13 is disposed at internal one side of a switchboard 1 to be rotatable by a latch 12. The catching member 13 is elastically supported to be attracted in one direction by a compression spring 14.

When the door 2 is closed, the door hook 21 overcomes an elastic force of the compression spring 14 and moves the catching member 13 in a direction opposite to an action direction of the compression spring 14, and after the door 2 is fully closed, an end of the door hook 21 is caught on the catching member 13, whereby a closed state of the door 2 is maintained.

On the other hand, when the door 2 is opened, an external manipulation handle 3 is downward attracted and moved to a reset position, and thus, the catching member 13 is rotated and moved in the direction opposite to the action direction of the compression spring 14. Therefore, interference of the door hook 21 and the catching member 13 is removed, and thus, the door 2 is opened.

Figure 3:
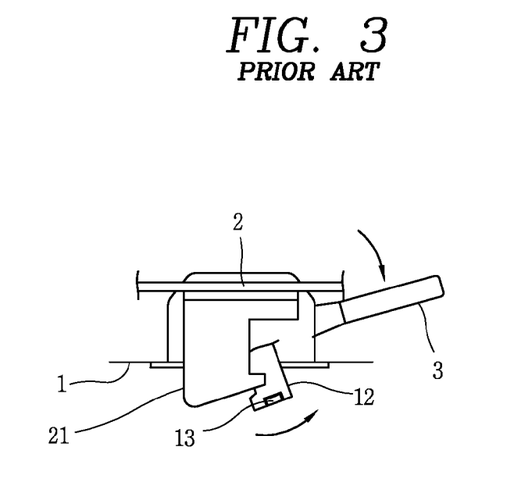
FIG. 3 is a schematic view for describing problems of the external handle manipulation device of the switchboard case of the prior art.

FIG. 3 is a schematic view for describing a problem of the external handle manipulation device of the switchboard case of the prior art.

In the external handle manipulation device of the switchboard case of the prior art, as illustrated in FIG. 3, the catching member 13 is disposed in parallel with a vertical plane of the door 2 with respect to a door-closed state, and a force F which is applied in the direction opposite to the action direction of the compression spring 14 is insufficient (F≈0) when the door hook 21 contacts the catching member 13. Therefore, due to the interference of the door hook 21 and the catching member 13, the door 2 is not closed well.

Figure 4:
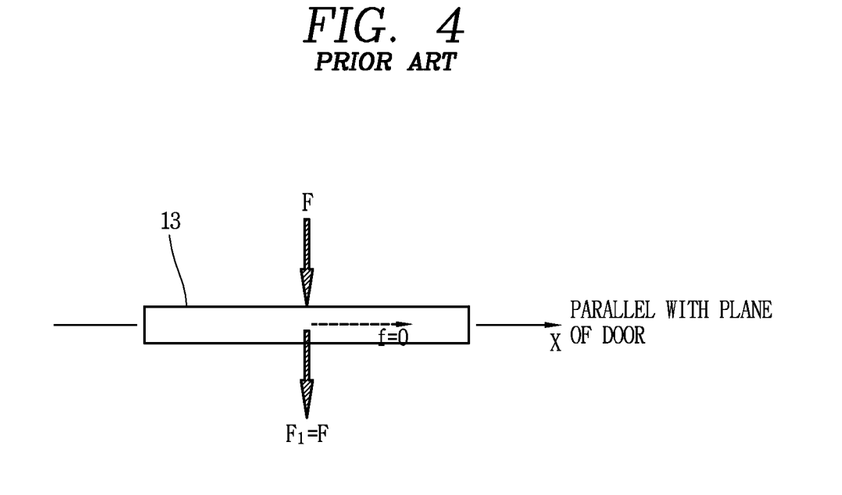
FIG. 4 is a state view illustrating a manipulation direction of a prior art external manipulation handle when the door is closed.

FIG. 4 is a state view illustrating a manipulation direction of the prior art external manipulation handle when the door is closed. In order to solve the problem, when the door 2 is closed, as illustrated in FIG. 4, by rotating the external manipulation handle 3 to the reset position with one hand, the catching member 13 is forcibly bound, and then, the interference of the door hook 21 and the catching member 13 is removed, whereupon the door 2 is fully closed. For this reason, there is difficulty in closing the door 2. That is, when desiring to close the door 2, in addition to a door operating force, a separate operating force (bound to the reset position) of the external manipulation handle 3 is needed.

SUMMARY OF THE DISCLOSURE

Therefore, an aspect of the detailed description is to provide a switchboard in which a door is closed by a small force even without binding an external manipulation handle to a reset position.

To achieve these and other advantages and in accordance with the purpose of this specification, as embodied and broadly described herein, a switchboard includes a switchboard case, a door, an external manipulation handle, and a catching member.

A circuit breaker may be built into the switchboard case.

The door may be mounted on the switchboard case in a hinge structure to be opened or closed.

The door may be configured to include a door hook.

The door hook may include an inclined surface at a front end thereof.

The external manipulation handle may be provided at an outer side of the switchboard case, and configured to manually, externally manipulate a switch-on or off operation of the circuit breaker.

The catching member may be disposed in the switchboard case to be contactable with the inclined surface of the door hook.

The catching member may rotate by contacting the inclined surface of the door hook according to a closing operation of the door.

The catching member may maintain a locked state of the door is maintained by catching the door hook on one side corner of the catching member.

The catching member may be twistingly disposed within a range which is contactable with the inclined surface of the door hook, and may maintain a large area contacting the inclined surface of the door hook.

The catching member may be disposed in parallel with the inclined surface of the door hook.

The switchboard may further include an operation link part configured to mechanically connect the circuit breaker to the external manipulation handle.

The switchboard may switch-on or off the circuit breaker in interoperation with the external manipulation handle.

The operating link part may include: a handle mounting part provided at the switchboard case, and hinge-coupled to one end of the external manipulation handle; and a latch coupled to an inside of the handle mounting part in a hinge structure.

The catching member may be diagonally coupled to one end of the latch with respect to a rear surface of the switchboard case, and when the door is closed, the catching member may be rotated by interference between the catching member and the inclined surface of the door hook.

The external manipulation handle may be provided at the switchboard case in a hinge structure, and may rotate in a direction from a front surface to a rear surface of the switchboard case.

The latch may include: a plate-shaped latch body disposed in parallel with the door hook; and a fixing groove formed at one end of the latch body to fix the catching member.

The operation link part may include a compression spring connected between the handle mounting part and the latch, and restore the latch to an original position.

The door hook may be formed to protrude from an inner side of an outer edge of the door with respect to a rotation axis of the door.

In closing the door, the inclined surface of the door hook may contact an inclined surface of the catching member to move one end of the latch in a reset manipulation direction of the external manipulation handle.

When the door is fully closed, the door hook may be caught by and fixed to the catching member.

The catching member may include: a coupling part overlappingly coupled to a backside of one end of the latch; and a catching part extending from the coupling part to intersect the door hook within a rotation range of the door hook.

The operation link part may further include an operating cam and a latch holder.

The operating cam may be coupled to an inside of the handle mounting part in a hinge structure to interoperate with the external manipulation handle.

The latch holder may be coupled to an eccentric side of the operating cam to engage with the latch.

The latch holder may be configured to include a projection accommodating groove.

The operation link part may include a link member, a connecting load, and an operating lever.

The link member may be coupled to the eccentric side of the operating cam in a hinge structure.

The connecting load may be connected to the link member.

The operating lever may be connected between the connecting load and a manual handle which is provided at the circuit breaker.

The operation link part may transfer a manipulating force of the external manipulation handle to the circuit breaker to switch on or off the circuit breaker.

The door hook may include a door coupling part and a hook projection.

The door coupling part may be coupled to an inner side of the door.

The hook projection may be formed to protrude in an inner direction of the door from the door coupling part.

The door coupling part may include a long hole, and adjust an interval between the door hook and the catching member.

As described above, in the switchboard according to the embodiments of the present invention, in closing a door, the catching member contacting the door hook is diagonally disposed on a door plane at a certain slope angle. Accordingly, the door is easily closed by a small force without binding the external manipulation handle to the reset position.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

The present disclosure relates to an external handle manipulation device of a switchboard case in which a door is easily closed.

Figure 5:
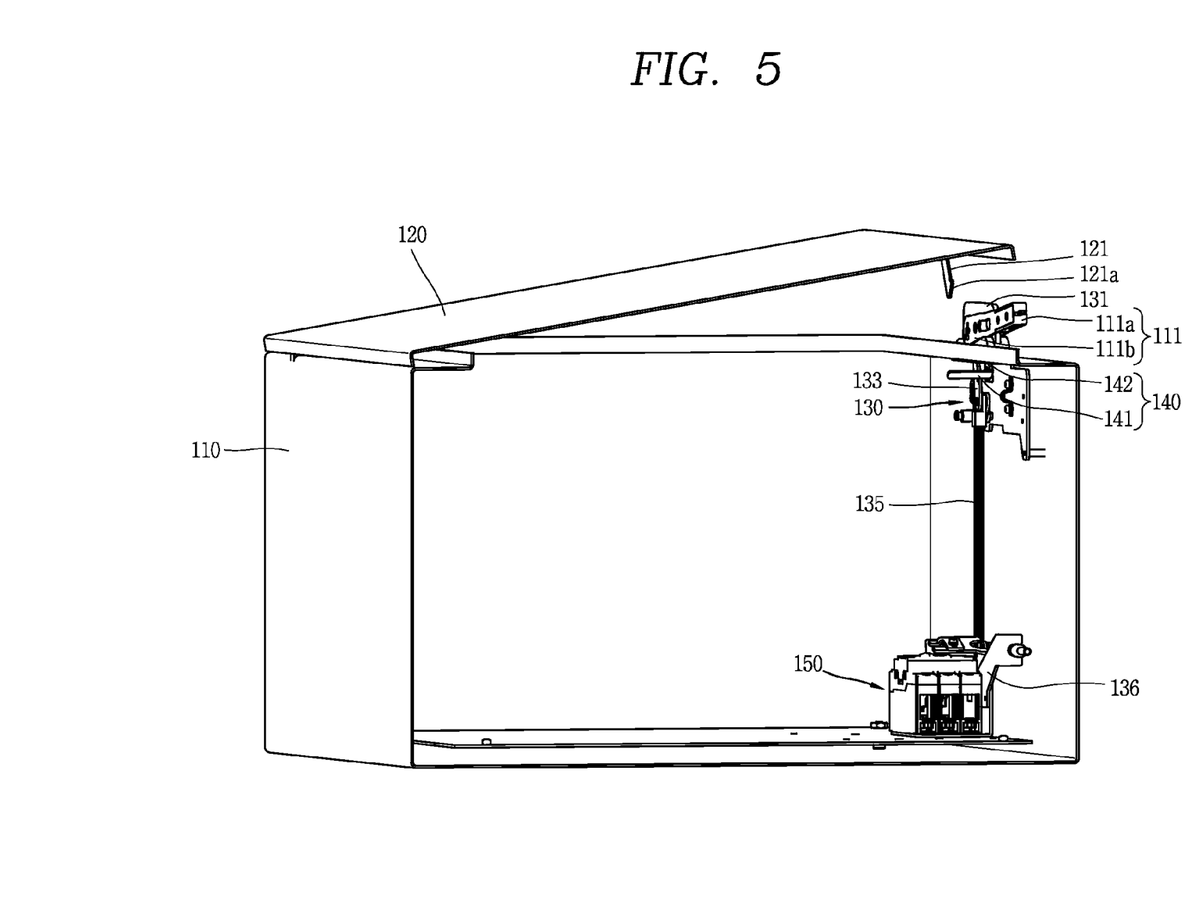
FIG. 5 is a perspective view illustrating a connection structure of an internal circuit breaker and an external handle manipulation device of a switchboard case according to an embodiment of the present invention.

FIG. 5 is a perspective view illustrating a connection structure of an internal circuit breaker 150 and an external handle manipulation device of a switchboard case 110 according to an embodiment of the present invention.

Referring to FIG. 5, the external handle manipulation device of the switchboard case 110 according to an embodiment of the present invention is a device for externally manipulating a switch-on/off of the circuit breaker 150 included in the switchboard case 110.

The switchboard case 110 is formed in rectangular box shape. A base plate is fixed in parallel with a rear inner surface of the switchboard case 110, and the circuit breaker 150 is mounted on the base plate. Here, the circuit breaker 150 may be an MCCB.

An external manipulation handle of externally manipulating a handle 151 of the circuit breaker 150 is provided at external front one side of the switchboard case 110 in a hinge structure, and a user may rotate the external manipulation handle 111 in an up and down direction (with respect to a position of the user).

The external manipulation handle 111 may be hinge-coupled to the switchboard 110 by a handle mounting part 131. A hinge part 111a is hinge-coupled to the handle mounting part 131 at a hinge axis and at one end of the external manipulation handle 111, and a handle part 111b is provided at the other end of the external manipulation handle 111. The hinge part 111a may be formed to branch from the handle part 111b with the handle mounting part 131 therebetween.

The handle mounting part 131 is provided outside the switchboard case 110, and the mounting plate 137 is provided vertical to a wall surface of the switchboard case 110.

An operation link part 130 is provided between the external manipulation handle 111 of the switchboard case 110 and the handle 151 of the circuit breaker 150 in order to transfer, to the manual handle 151 of the circuit breaker 150, an external operating force for operating an on/off position of the circuit breaker 150.

Figure 6A:
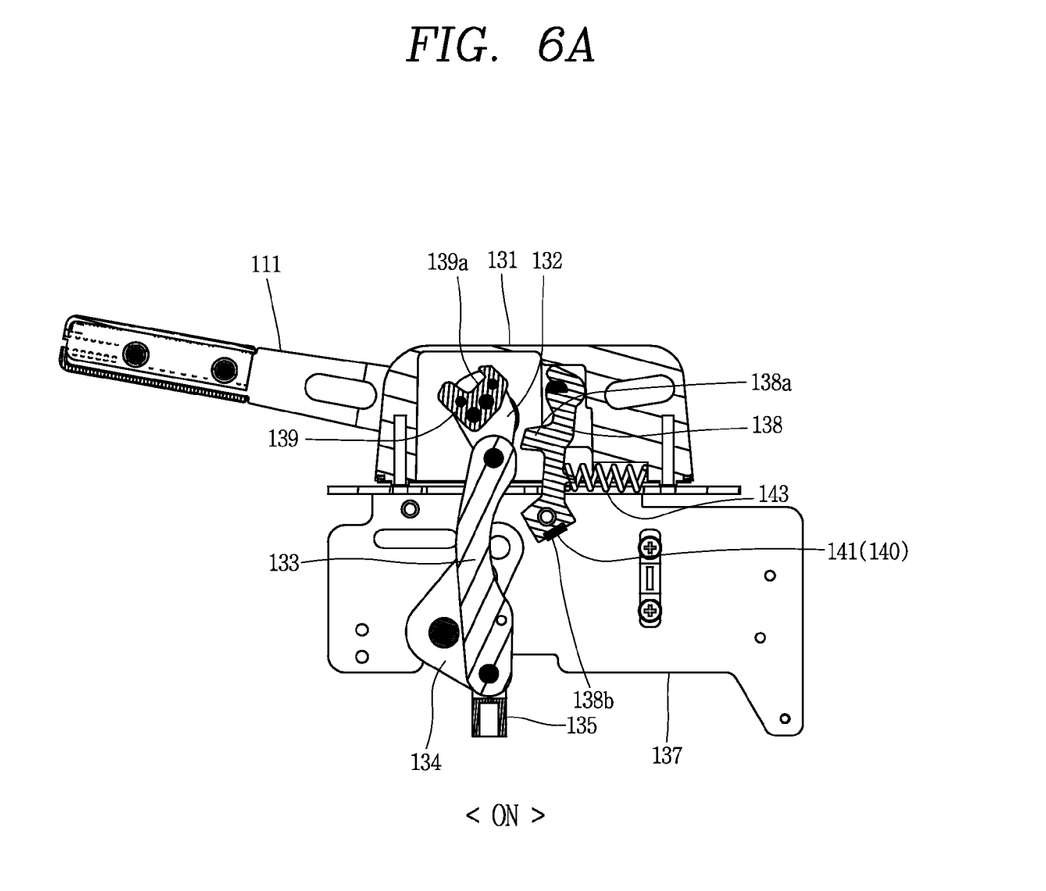
FIGS. 6A to 6C are cross-sectional views illustrating an operation mechanism of an internal element of a handle mounting part based on an operation position of an external manipulation handle according to an embodiment of the present invention.
Figure 6B:
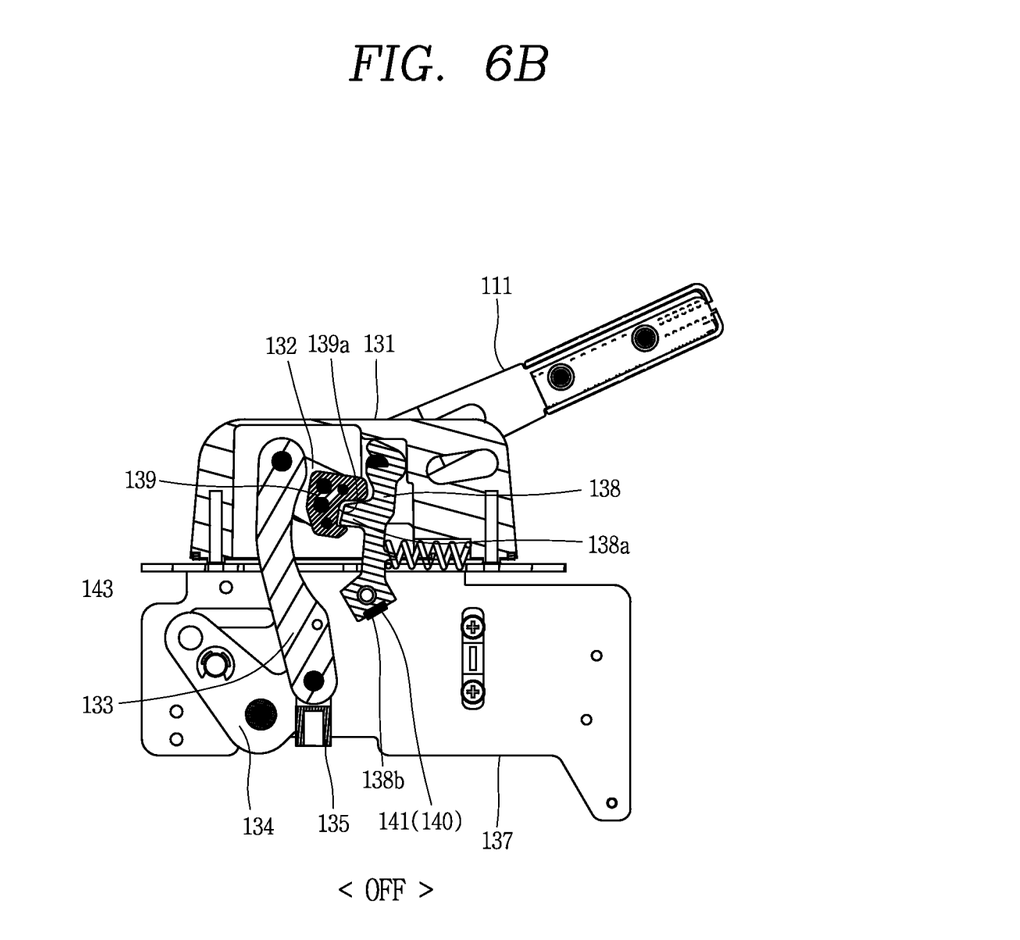
Figure 6C:
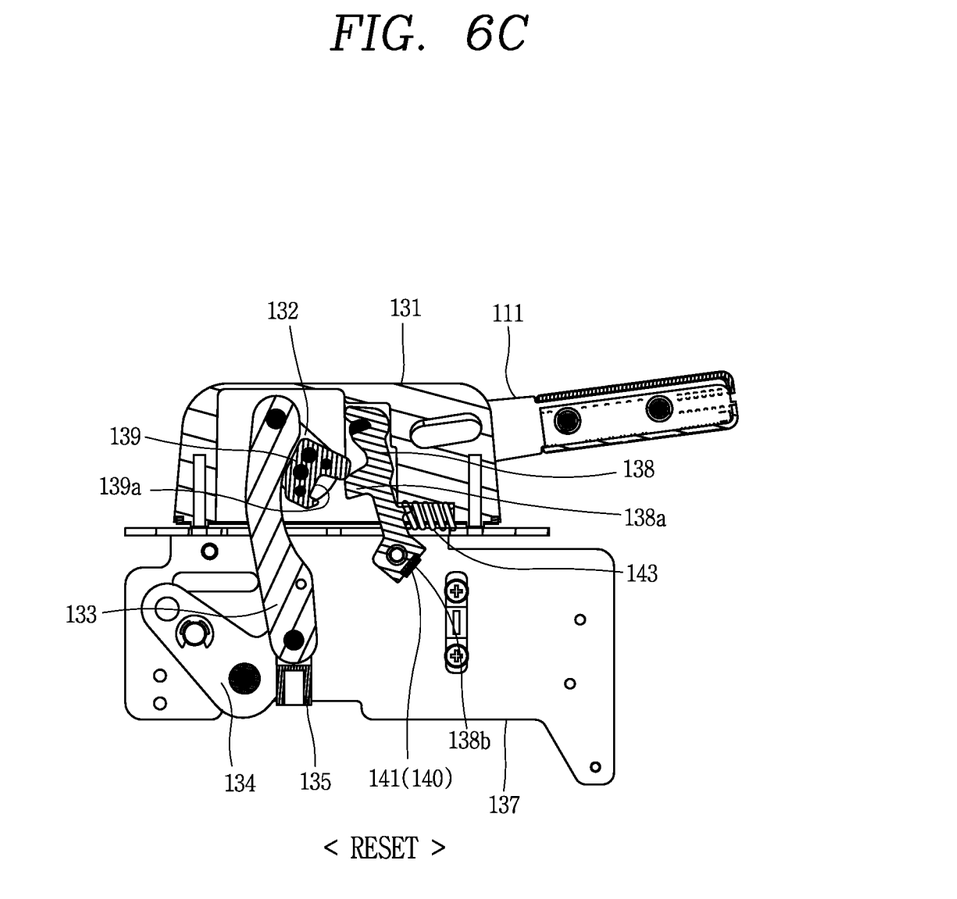

FIGS. 6A to 6C are cross-sectional views illustrating an operation mechanism of an internal element of the handle mounting part 131 based on an operation position of the external manipulation handle 111 according to an embodiment of the present invention.

To describe a configuration of the operation link part 130 with reference to FIGS. 5 and 6, the operation link part 130 includes: an operating cam 132 that is coupled to the inside of the handle mounting part 131 in a hinge structure; a latch holder 139 and a link member 133 that are respectively coupled to one side and the other side of the operating cam 132; a latch 138 that is disposed to engage with the latch holder 139; a connecting load 135 that is connected to the link member 133; and an operating lever 136 that is connected to the connecting load 135, and operates the handle 151 of the circuit breaker 150 to an on/off position.

The handle mounting part 131 may include an internal space, and thus, the link member 133, the operating cam 132, and the latch 138 may rotate and move. The handle mounting part 131 may include an opening which is formed at a portion contacting the switchboard case 110 so as to communicate with the inside of the switchboard case 110, and the link member 133 and the latch 138 may rotate through the opening.

The operating cam 132 is connected to the hinge part 111a of the external manipulation handle 111, and rotates within the same angle range as that of the external manipulation handle 111.

One end of the link member 133 is hinge-coupled to a position slanted to one side from the center of the operating cam 132, and the other end of the link member 133 is hinge-coupled to a guide cam 134.

A rotation motion of the external manipulation handle 111 may be changed to a linear motion by a coupling structure of the operating cam 132 and the link member 133.

The guide cam 134 may be rotatably provided at the mounting plate 137 by an eccentric axis, and hinge-coupled to the link member 133 by a hinge pin which is disposed to be separated in one direction from the eccentric axis. Therefore, the guide cam 134 may guide a vertical and linear motion (see FIG. 6) of the link member 133.

Moreover, the latch holder 139 is fixed to a position slanted to the other side from the center of the operating cam 132, and rotates within the same rotation angle range as that of the operating cam 132. Also, the latch holder 139 includes a projection accommodating groove 139a, which is formed at one side, and a plurality of catching jaws that are respectively formed at an upper position and a lower position with the projection accommodating groove 139a therebetween.

The latch 138 may be coupled to the inside of the handle mounting part 131 in a hinge structure, and may be rotatably supported. A latch projection 138a may be provided at the middle of the latch 138, and inserted into the projection accommodating groove 139a of the latch holder 139. Therefore, the latch holder 130 may be coupled to the latch 139 to engage with each other.

In this case, the latch 138 is elastically supported by the compression spring 143. In detail, one end of the compression spring 143 is connected to the latch 18 through a fixed projection which is formed at the latch 138, and the other end of the compression spring 143 is fixed through a spring fixing groove which is formed in the handle mounting part 131. Therefore, a lower end of the latch 138 is disposed in a vertical direction (a down direction in the drawing) of a rear surface of the switchboard case 110.

One end of the connecting load 135 is coupled to the other end of the link member 133, and the other end of the connecting load 135 is connected to the operating lever 136. The connecting load 133 moves upward and downward in interoperation with the link member 133.

The operating lever 136 is provided at a side of the circuit breaker 150 to be separated in an axial direction, and is coupled to a supporting plate in a hinge structure. Therefore, the operating lever 136 may rotate in the same direction as a handle rotation direction of the circuit breaker 150.

FIG. 6A illustrates an on position of the external manipulation handle 111, FIG. 6B illustrates an off position of the external manipulation handle 111, and FIG. 6C illustrates a reset position of the external manipulation handle 111.

Referring to FIGS. 6A to 6C, the on position, off position, and reset position of the external manipulation handle 111 may be selected according to a manipulation of the external manipulation handle 111.

The on position, off position, and reset position of the external manipulation handle 111 correspond to an on position, off position, and reset position of the circuit breaker 150, respectively.

A switch-on manipulation of the external manipulation handle 111 denotes rotating the external manipulation handle 111 in one direction (left in the drawing) so as to switch on the circuit breaker 150.

A switch-off manipulation of the external manipulation handle 111 denotes rotating the external manipulation handle 111 in the other direction (right in the drawing) so as to switch off the circuit breaker 150.

A reset manipulation of the external manipulation handle 111 denotes that the external manipulation handle 111 is rotated in the other direction, namely, the same direction as a switch-off manipulation direction, and moreover is more rotated than the switch-off manipulation direction. In this case, the reset position of the external manipulation handle 111 corresponds to a state in which an engagement of the latch holder 139 and the latch 138 is released, and also corresponds to a state in which there is no interference between the door hook 121 and the catching member 140 of the latch 138.

Moreover, a switch-on manipulation position and switch-off manipulation position of the external manipulation handle 111 correspond to a state in which a compression load is not applied to the compression spring 143, and the reset position of the external manipulation handle 111 corresponds to a state in which the compression load is applied to the compression spring 143.

In this case, the off position of the external manipulation handle 111 corresponds to a state in which the latch projection 138*a* of the latch 138 engages with the projection accommodating groove 139*a* of the latch holder 139. When the door 120 is in an open state, a binding force is released, and then, the external manipulation handle 111 is naturally moved from the reset position to the off position by an elastic restoring force of the compression spring 143. In addition, when the latch 138 engages with the latch holder 139 in a state where the door 120 is opened, it is impossible for the external manipulation handle 111 to move from the off position to the on position.

However, in an embodiment of the present invention, when the door 120 is in a closed state, the catching member 140 of the latch 138 is disposed at the reset position, namely, the engagement of the latch holder 139 and the latch 138 is released by the door hook 121 in a state where the compression spring 143 is compressed, and thus, the external manipulation handle 111 may be freely moved to the on/off position.

Here, the catching member 140 may be fixed to a fixing groove 138*b* which is formed at a lower end of the latch 138.

The catching member 140 may have a rectangular plate structure in which a thickness is thin and a length is longer than a width, and may be fixed to the fixing groove 138*b*.

The fixing groove 138*b*, as illustrated in FIGS. 6A and 6B, is slopingly formed at a lower end of the latch 138 supported by the compression spring 143 at the on position and off position of the external manipulation handle 111.

For example, in FIGS. 6A and 6B, the latch 138 may be long formed in an up and down direction, and an inclined direction of the fixing groove 138*b* may form an included angle of about 30 degrees to about 70 degrees with a central line of the latch 138 in a long-axial direction. The included angle may be changed by those skilled in the art.

The catching member 140 fixed to the fixing groove 138*b* is disposed within a moving range of the door hook 121. That is, when the door 120 is closed, an inclined surface of the door hook 121 contacts the catching member 140 to make interference, and compression load is applied to the compression spring 143 by pushing the catching member 140 in a compression direction of the compression spring 143.

In this case, the latch 138 is in a state of being rotated in a right direction in the drawing, namely, a state in which the compression direction of the compression spring 143 is rotated, and as illustrated in FIG. 6C, the catching member 140 is further moved in the compression direction of the compression spring 143, whereby the engagement of the latch holder 139 and the latch 138 is released.

An operation mechanism of the latch 138 and the latch holder 139 based on an operation position of the external manipulation handle 111 will now be described with reference to FIGS. 6A to 6C.

First, when the external manipulation handle 111 is rotated from the on position to the off position, namely, when the external manipulation handle 111 of FIG. 6A is clockwise rotated, the operating cam 132 is clockwise rotated, and the latch holder 138 coupled to one side of the operating cam 132 is clockwise rotated, whereby a lower catching jaw of the latch holder 139 downward presses the latch projection 138*a* of the latch 138. At this time, a rotating force of the latch holder 139 overcomes an elastic force of the compression spring 143 and further rotates the latch 138, and thus, interference of the lower catching jaw of the latch holder 139 and the latch projection 138*a* is released. Simultaneously, the latch 138 is restored to the original position by the elastic restoring force of the compression spring 143, and the latch projection 138*a* is inserted into the projection accommodating groove 139*a* of the latch holder 139 to engage with the latch holder 139. Therefore, the external manipulation handle 111 is in an unload state, namely, at the off position.

On the other hand, when desiring rotate the external manipulation handle 111 from the off position to the on position, a locked state of the latch holder 139 and the latch 138 should be released. To this end, if the door 120 is in an open state, a separate release unit further rotates the latch 138 in the compression direction of the compression spring 143 to release an engaged state of the latch 138 and the latch holder 139.

Figure 7A:
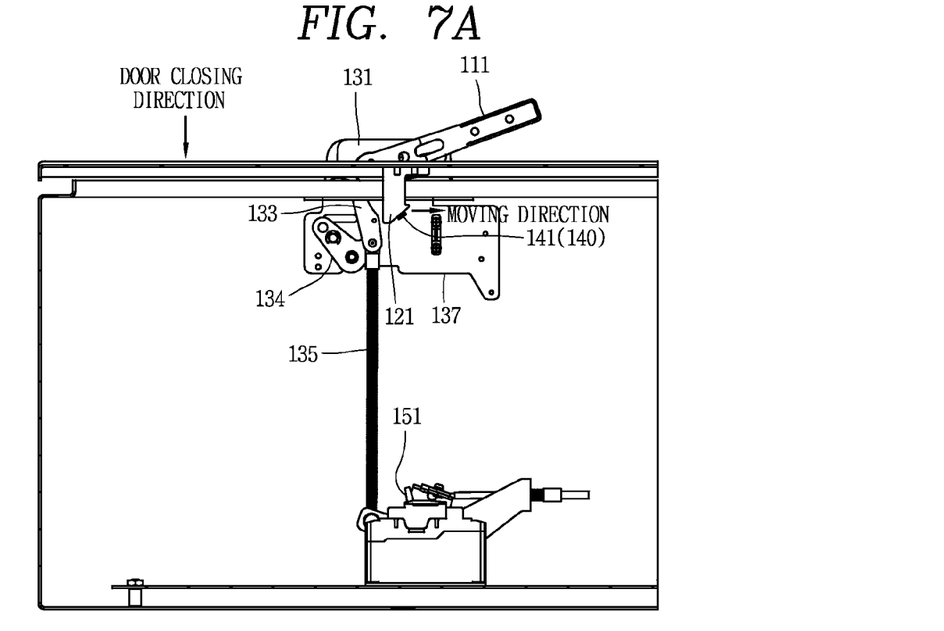
FIG. 7A is a side view illustrating a state in which a door hook contacts a catching member immediately before a door according to an embodiment of the present invention is closed.
Figure 7B:
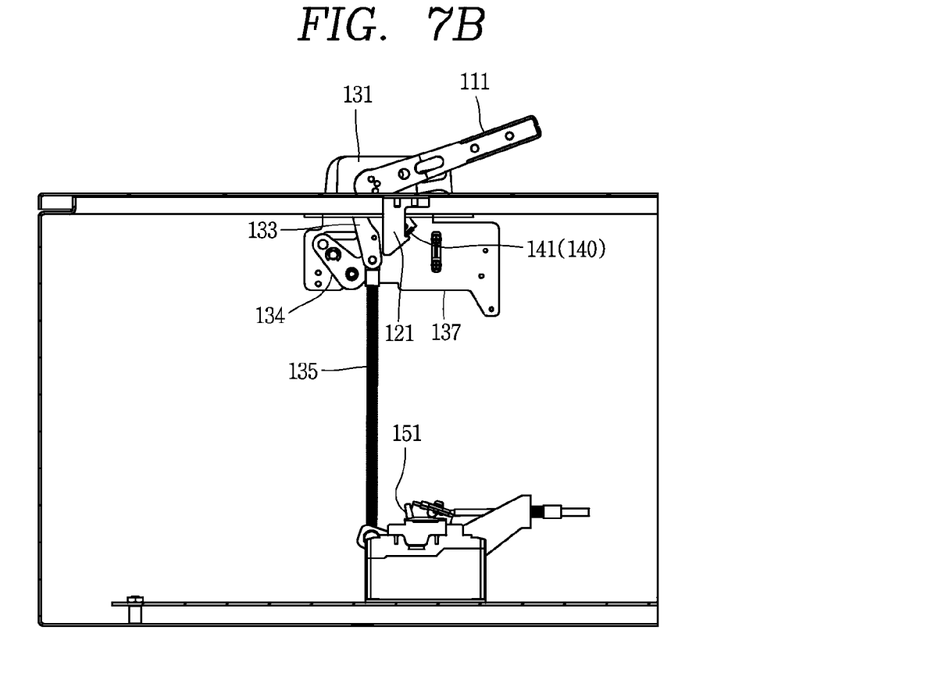
FIG. 7B is a side view illustrating a closed state of a door according to an embodiment of the present invention.
Figure 8:
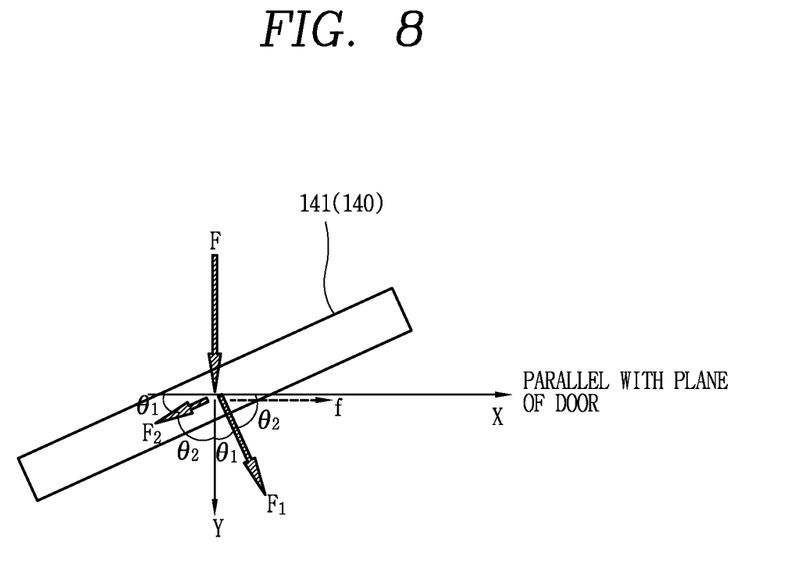
FIG. 8 is a schematic view schematically illustrating an action direction of weight transferred from the door hook to the catching member in FIG. 7A.
Figure 9:
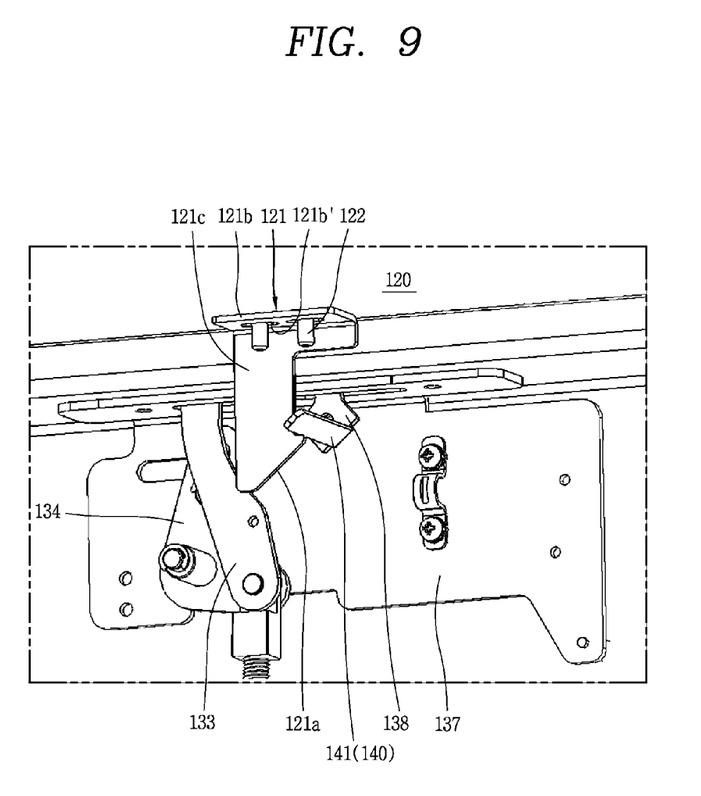
FIG. 9 is a bottom perspective view of a door hook according to an embodiment of the present invention.

FIG. 7A is a side view illustrating a state in which the door hook 121 contacts the catching member 140 immediately before the door 120 according to an embodiment of the present invention is closed, and FIG. 7B is a side view illustrating a closed state of the door 120 according to an embodiment of the present invention. FIG. 8 is a schematic view schematically illustrating an action direction of weight transferred from the door hook 121 to the catching member 140 in FIG. 7A. FIG. 9 is a bottom perspective view of the door hook 121 according to an embodiment of the present invention.

The external handle manipulation device of the switchboard case 110 has a door locking function of locking or unlocking the door 120.

A door locking unit for performing the door locking function includes the door hook 121, which is fixed to an inner surface of the door 120, and the catching member 140 which is coupled to a lower end (with respect to the drawing) of the latch 138 and is disposed to be inclined with respect to a vertical surface of the switchboard case 110.

Referring to FIG. 9, the door hook 121 may include a door coupling part 121*b*, which is coupled to an inner surface of the door 120 so as to contact a surface therebetween, and a hook projection 121*c* which is formed to protrude in an inner direction of the door from the door coupling part 121*b*.

The door coupling part 121*b* may include a long hole 121*b'* through which a coupling bolt 122 passes. When the door hook 121 is assembled with the door 120 by the coupling bolt 122 and a nut, by adjusting a position of the door hook 121, a catching part 141 of the latch 138 and the door hook 121 may be adjusted to a position which makes interference therebetween.

For example, in closing the door 120, when an interval between the door hook 121 and the catching part 141 more increases than the original position and thus the catching part 141 is not moved by the door hook 121 by a distance corresponding to a desired position, a position of the door hook 121 may be readjusted to be moved to a position close to the catching part 141 by using the long hole 121*b'*.

In order to adjust the door hook 121, a coupled state of the nut may be released, and then, the door hook 121 may be moved through a free space of the long hole 121*b'* and readjusted.

The catching member 140 may include: a catching part 141 which has a rectangular plate structure in which a length is longer than a width, and when the door 120 is closed, contacts an inclined surface 121a of the door hook 121, and a coupling part 142 which is vertically bent from one end of the catching part 141 to extend, and is overlappingly coupled to a lower end of the latch 138.

The catching part 141, which extends in a side direction from the other end of the latch 138, is disposed within a rotation range of the door hook 121.

A door locking operation, which is performed by the door hook 121 and the catching member 140 when the door 120 is closed, will now be described.

Referring to FIG. 7A, a force for closing the door 120 is applied to the door 120. When the door 120 is closed, the inclined surface 121a of the door hook 121 contacts the catching part 141. In this case, the inclined surface 121a of the door hook 121 denotes one side surface of the hook projection 121c which is provided at a lower end of the door hook 121, and is tapered in order for a width to be broadened progressively closer to an up direction (the coupling part 142 of the door hook 121).

The door hook 121 moves in a door closing direction, overcomes the elastic force of the compression spring 143, and moves the catching member 140 in a compression direction (a direction of an arrow). As illustrated in FIG. 7B, when the door hook 121 is further lowered, the catching part 141 is caught on the inside of the hook projection of the door hook 121, and thus, the door 120 is fully closed. In this case, the door hook 121 is caught on the catching part 141, and thus, the door 120 is in a locked state.

When desiring to open the door 120, by rotating the external manipulation handle 111 to the reset position, the door may be opened in a state where the engagement of the door hook 121 and the catching member 140 is released.

In the present embodiment, the catching part 141 is diagonally disposed at a certain angle "θ1" with respect to a plane (a plane when the door 120 is closed) of the door 120 unlike the prior art catching member 140.

The reason that the catching part 141 is diagonally disposed at the certain angle "θ1" is for that when the door hook 121 contacts the catching part 141, component load transferred from the door hook 121 to the catching part 141 increases, and thus, the door 120 is easily closed by a small force.

Here, the catching part 141 is fixed to the fixing groove 138b of the latch 138, and thus is bound by a rotation motion of the latch 138.

For example, by rotating the external manipulation handle 111 to the reset position, a rotating force may be transferred from the operating cam 132 and the latch holder 139 to the latch 138 through the latch projection 138a, and due to the transferred rotating force, the latch 138 may overcome the elastic force of the compressing spring 143 and may be rotated to the reset position of the external manipulation handle 111, whereby the catching part 141 is moved in a moving direction of an arrow. When the binding of the external manipulation handle 111 is released at the reset position, the latch 138 may be restored to the original position by the elastic restoring force of the compression spring 143.

In the prior art, when the catching part 141 is disposed in parallel with the plane of the door 120 with respect to a closed state of the door 120, as illustrated in FIG. 4, force F transferred from the door hook 121 is transferred in a vertical direction of the catching member 140, and force f which is transferred in a movable plane direction of the catching member 140 becomes 0.

However, according to an embodiment of the present invention, since the catching part 141 is diagonally disposed on the plane of the door 120 with respect to a closed state of the door 120, as illustrated in FIG. 8, force F transferred from the door hook 121 may be divided into a component force F1 in a vertical direction of the catching part 141 and a component force F2 in a plane direction of the catching part 141, and force f is applied to the catching part 141 by the component forces F1 and F2 in a direction parallel to the plane of the door 120. The force f may be defined as "F1 cos θ2−F2 cos θ1".

Therefore, due to a skew structure of the catching member 140, the door 120 is closed by only a manipulating force f of the door 120 without binding the external manipulation handle 111 to the reset position.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A switchboard comprising:
a switchboard case with a built-in circuit breaker;
a door mounted on the switchboard case in a hinge structure to be opened or closed, and configured to include a door hook including an inclined surface at a front end;
an external manipulation handle provided at an outer side of the switchboard case, and configured to cause an on or off operation of the circuit breaker; and
an operation link part configured to mechanically couple the circuit breaker to the external manipulation handle and switch the circuit breaker on or off in response to manipulation by the external manipulation handle;
wherein the operating link part comprises:
a handle mounting part provided at the switchboard case and coupled to one end of the external manipulation handle via a hinge; and
a latch coupled to the handle mounting part, the latch comprising a plate shaped catching member;
wherein the catching member is disposed in the switchboard case to be contactable with the inclined surface of the door hook and disposed in parallel with the inclined surface of the door hook, and
wherein the catching member is rotated by the inclined surface of the door hook according to a closing operation of the door, and a locked state of the door is maintained by securing the door hook against a side corner of the catching member.

2. The switchboard of claim 1, wherein the catching member is twistingly disposed within a range which is contactable with the inclined surface of the door hook, and a large area contacting the inclined surface of the door hook is secured.

3. The switchboard of claim 1,
wherein the catching member is diagonally coupled to one end of the latch with respect to a rear surface of the switchboard case, and when the door is closed, the catching member is rotated by interference between the catching member and the inclined surface of the door hook.

4. The switchboard of claim 1, wherein the external manipulation handle is provided at the switchboard case in a hinge structure, and rotates in a direction from a front surface to a rear surface of the switchboard case.

5. The switchboard of claim 3, wherein the latch comprises:
a plate-shaped latch body disposed in parallel with the door hook; and
a fixing groove formed at one end of the latch body to fix the catching member.

6. The switchboard of claim 3, wherein the operation link part comprises a compression spring connected between the handle mounting part and the latch, and restores the latch to an original position.

7. The switchboard of claim 3, wherein,
the door hook is formed to protrude from an inner side of an outer edge of the door with respect to a rotation axis of the door,
in closing the door, the inclined surface of the door hook contacts an inclined surface of the catching member to move one end of the latch in a reset manipulation direction of the external manipulation handle, and
when the door is fully closed, the door hook is caught by and fixed to the catching member.

8. The switchboard of claim 3, wherein the catching member comprises:
a coupling part overlappingly coupled to a backside of one end of the latch; and
a catching part extending from the coupling part to intersect the door hook within a rotation range of the door hook.

9. The switchboard of claim 3, wherein the operation link part further comprises:
an operating cam coupled to an inside of the handle mounting part in a hinge structure to interoperate with the external manipulation handle; and
a latch holder coupled to an eccentric side of the operating cam to engage with the latch, and configured to include a projection accommodating groove.

10. The switchboard of claim 9, wherein,
the operation link part comprises:
a link member coupled to the eccentric side of the operating cam in a hinge structure;
a connecting load connected to the link member; and
an operating lever connected between the connecting load and a manual handle which is provided at the circuit breaker, and
the operation link part transfers a manipulating force of the external manipulation handle to the circuit breaker to switch on or off the circuit breaker.

11. The switchboard of claim 1, wherein,
the door hook comprises:
a door coupling part coupled to an inner side of the door; and
a hook projection formed to protrude in an inner direction of the door from the door coupling part, and
the door coupling part comprises a long hole, and adjusts an interval between the door hook and the catching member.

* * * * *